(12) United States Patent
Browne et al.

(10) Patent No.: US 7,783,551 B1
(45) Date of Patent: Aug. 24, 2010

(54) METHOD AND SYSTEM FOR SIMULATING RISK FACTORS IN PARAMETRIC MODELS USING RISK NEUTRAL HISTORICAL BOOTSTRAPPING

(75) Inventors: Sid Browne, Brooklyn, NY (US); Arthur Maghakian, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

(21) Appl. No.: 11/740,189

(22) Filed: Apr. 25, 2007

Related U.S. Application Data

(63) Continuation of application No. 09/896,660, filed on Jun. 29, 2001, now Pat. No. 7,228,290.

(51) Int. Cl.
*G06Q 40/00* (2006.01)
(52) U.S. Cl. .................. 705/36 R; 705/35; 705/37; 705/38; 707/202
(58) Field of Classification Search .............. 705/35
See application file for complete search history.

(56) References Cited

U.S. PATENT DOCUMENTS

| | | |
|---|---|---|
| 5,819,237 A | 10/1998 | Garman |
| 5,930,762 A | 7/1999 | Masch |
| 6,058,377 A | 5/2000 | Traub et al. |
| 6,085,175 A | 7/2000 | Gugel et al. |
| 6,122,623 A | 9/2000 | Garman |

OTHER PUBLICATIONS

Emanuel Derman, Iraj Kani and Joseph Z. Zou, "The Local Volatility Surface," Quantitative Strategies Research Notes, Dec. 1995, pp. 1-28.
John Hull and Alan White, "Incorporating Volatility Updating into the Historical Simulation Method for Value-At-Risk," The Journal of Risk, 1998, vol. 1, No. 1, pp. 4-19.

*Primary Examiner*—Kirsten S Apple
(74) *Attorney, Agent, or Firm*—Chadbourne & Parke LLP; Walter G. Hanchuk

(57) ABSTRACT

An improved method for simulating noise-varying risk factor values in a parametric simulation comprises analyzing historical data to determine the actual value of the risk factors and other attributes in the model and using this data to generate historical residual values which reproduces the historical price when used in the model with corresponding historical attribute values. The set of historical residual values is standardized and can be bootstrapped to increase the number of members in the set or vary the sets properties. Values of the historical residuals are then selected, e.g., at random, and used in place of the random noise components to produce simulated risk factor values which are used in the parametric model to simulate the evolution of the instrument price.

24 Claims, 3 Drawing Sheets

METHOD AND SYSTEM FOR SIMULATING RISK FACTORS IN PARAMETRIC MODELS USING RISK NEUTRAL HISTORICAL BOOTSTRAPPING

RELATED APPLICATIONS

The present application is a continuation application of prior application Ser. No. 09/896,660 filed Jun. 29, 2001 to which priority under 35 USC §120 is claimed and is hereby incorporated by reference.

FIELD OF THE INVENTION

This invention is related to a method and system for measuring market and credit risk and, more particularly, to an improved method for the simulation of risk factors in parametric models for use in making value at risk and other risk evaluations.

BACKGROUND

A significant consideration which must be faced by financial institutions (and individual investors) is the potential risk of future losses which is inherent in a given financial position, such as a portfolio. There are various ways for measuring potential future risk which are used under different circumstances. One commonly accepted measure of risk is the value at risk ("VAR") of a particular financial portfolio. The VAR of a portfolio indicates the portfolio's market risk at a given percentile. In other words, the VAR is the greatest possible loss that the institution may expect in the portfolio in question with a certain given degree of probability during a certain future period of time. For example, a VAR equal to the loss at the $99^{th}$ percentile of confidence level indicates that there is only a 1% chance that the loss will be greater than the VAR during the time frame of interest.

Generally, financial institutions maintain a certain percentage of the VAR in reserve as a contingency to cover possible losses in the portfolio in a predetermined upcoming time period. It is important that the VAR estimate be accurate. If an estimate of the VAR is too low, there is a possibility that insufficient funds will be available to cover losses in a worst-case scenario. Overestimating the VAR is also undesirable because funds set aside to cover the VAR are not available for other uses.

To determine the VAR for a portfolio, one or more models which incorporate various risk factors are used to simulate the price of each instrument in the portfolio a large number of times using an appropriate model. The model characterizes the price of the instrument on the basis of one or more risk factors, which can be broadly considered to be a market factor which is derived from tradable instruments and which can be used to predict or simulate the changes in price of a given instrument. The risk factors used in a given model are dependent on the type of financial instrument at issue and the complexity of the model. Typical risk factors include implied volatilities, prices of underlying stocks, discount rates, loan rates, and foreign exchange rates. Simulation involves varying the value of the risk factors in a model and then using the model to calculate instrument prices in accordance with the selected risk factor values. The resulting price distributions are aggregated to produce a value distribution for the portfolio. The VAR for the portfolio is determined by analyzing this distribution.

There are two alternative simulation techniques which are conventionally used during risk analysis, such as VAR calculations: parametric simulation and historical simulation.

In a parametric simulation, the change in value of a given price for a security is simulated by changing the value of the risk factors in the model from their initial values according to a stochastic or random function. A well known model used in option pricing is the Black-Scholes model which models the change in a stock price S over a time interval t as a function of $\sigma\sqrt{\Delta t}\epsilon$, where $\sigma$ is a risk factor indicating the volatility of the price, and $\epsilon$ is a random component. Parametric simulation has the advantage of being very flexible. For example, the values of the parameters which define the model can be adjusted as required to make the model risk neutral. In addition, when the starting values of the model parameters cannot be determined or implied from actual data, default parameters can be used until reliable historical or market data is available.

A serious drawback to this technique, however, is that the noise components $\epsilon$ used to vary the risk factor values are generally assumed to have a normal distribution. In reality, low probability events occur with more frequency than in a normal distribution. As a result, so-called "fat-tails" of the probability curve must be explicitly defined in the model and used to alter the normal distribution of $\epsilon$.

Another problem with parametric models is that the model must expressly model cross-correlations between various risk factors. Typically, a variance-covariance matrix is used to preserve a predetermined correlation between the various risk factors during a simulation. An underlying assumption to this technique is that the correlations between various factors are constant across the range of input parameters. However, the correlations can vary depending on the circumstances. Detecting these variations and compensating for them through the use of multiple variance-covariance matrices is difficult and can greatly complicate the modeling process. In addition, the computational cost of determining the cross-correlations grows quadratically with the number of risk factors. It is not unusual for large derivative portfolios to depend on 1000 or more risk factors and determining the cross-correlations for the risk factors quickly becomes unmanageable, particularly when the simulation process must be run daily.

An alternative to parametric simulation is historical simulation. In a historical simulation, a historical record of data is analyzed to determine the actual risk factor values. To simulate price evolution, risk factor values are selected at random from the historical set and applied to the model to determine the next price in the simulation. This approach is extremely simple. Because historical data is used as a direct source for the risk factor values, the methodology does not require calculation of model parameters, such as correlations and volatilities. Moreover, the fat-tail event distribution and stochastic correlations between various factors is automatically reproduced. However, this method is limited because the statistical distribution of values is restricted to the specific historical sequence which occurred. In addition, historical data may be missing or non-existent, particularly for newly developed risk factors, and the historical simulation is generally not risk neutral.

Accordingly, there is a need for an improved technique for adjusting the value of risk factors during simulation of a financial instrument, e.g., for use in risk analysis.

SUMMARY OF THE INVENTION

This and other needs are addressed by present invention which provides an improved method for varying the value of risk factors in a parametric simulation. The new method accurately accounts for "fat-tail" probability distributions and cross-correlation between various risk factors while allowing the model to be risk neutral. In addition, the method is suitable for use in developing models which are accurate for both short horizon VAR simulations and long horizon potential credit exposure ("PE") simulations.

Initially, the risk factors used in a parametric model of a given attribute, such as the price of an instrument, are identified. The historical data is analyzed to determine the actual value of those risk factors over a certain period along with the value of the modeled attribute. The historical risk factor values and the corresponding attribute values are then applied to the parametric model and the model is solved to derive a set of historical residuals that quantify the values of the noise factors $\epsilon$ needed to reproduce the historical values of the attribute using the historical risk factor values in the model. The distribution of the residuals values is then standardized. A bootstrapping procedure can be performed to increase the number of residual values in the set.

During simulation, values from the standardized set of historical residuals are selected at random and used as the $\epsilon$ values in the parametric model. Advantageously, the historically derived residuals retain the underlying correlation between the various risk factors while still permitting the model to be risk neutral. As a result, there is no need to separately determine cross-correlations or correct for them using a variance-covariance matrix. Further, because the data is historically derived, the distribution of residual values retains historical fat-tail distributions which are absent in the normal distributions used in conventional parametric simulation.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
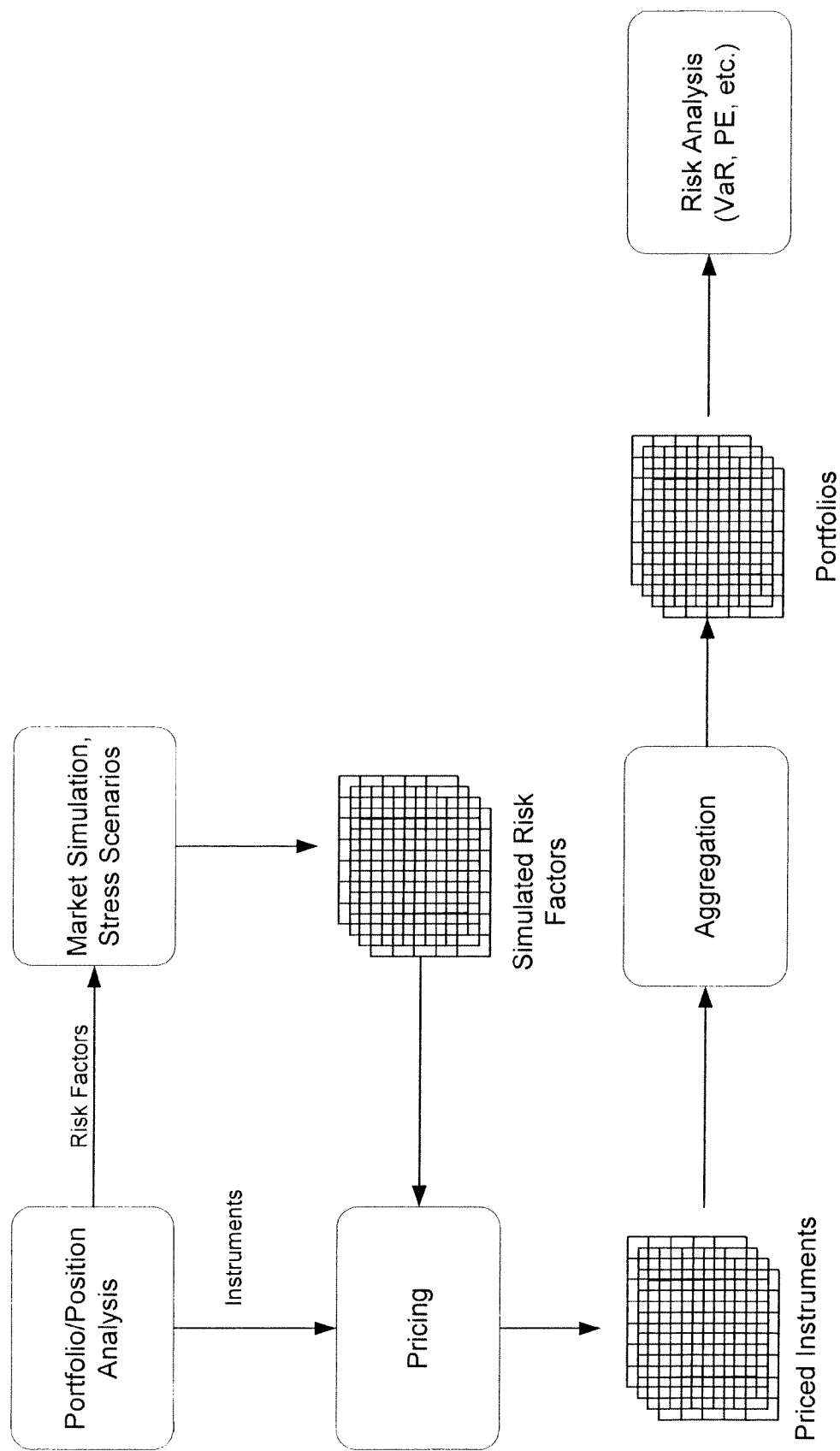
FIG. 1 is a flow diagram of a process for determining the value at risk for a portfolio.

Turning to FIG. 1, there is shown a general flow diagram of a system for evaluating an integrated risk in a portfolio. Initially, the portfolio or position at interest is analyzed to determine the appropriate risk factors to apply. The risk factors are simulated using a market simulation model or other stress scenarios to produce sets of simulated risk factors for the time period of interest. The simulated risk factors are applied to pricing models for the various instruments in the portfolio and a set simulated prices for each of the instruments is generated. The simulated values for the priced instruments are then aggregated to produce a set of simulated prices for the portfolio. These prices can then be analyzed to evaluate various risk measures, such as VAR.

According to the invention, a risk neutral bootstrap method is used to generate a set of historical residuals for a given factor in a parametric model based. The residuals are determined by calculating the value of the factor at the time of each historical sample and then determining what residual "random" value of $\epsilon$ would be required to produce the actual historical price or other modeled value using the model. The distribution of historical residuals is standardized and then used to generate the simulated factor values which can then be applied to the model to simulate the performance of the instrument over a given time period, e.g., in order to determine the VAR.

In an arbitrary parametric model used in simulation, the change in value dF of a given value F, such as price of a security or a market variable effecting the price of a variable that is subjected to a "noisy" variation over time, is represented by a model M which includes at least one parameter a. The variations in factors are induced by random error or noise terms $\epsilon_1 \ldots \epsilon_k$:

$$dF = M(F, a_1, a_2, \ldots, a_n, \epsilon_1, \epsilon_2, \epsilon_k) \quad \text{(Equ. 1)}$$

The risk factors used in a given model are dependent on the type of financial instrument at issue. Typical risk factors for the price of a security include implied volatilities, prices of underlying stocks, discount rates, loan rates, and financial exchange rates. Some of these risk factors, such as a time until expiration, are deterministic and have values which can easily be determined for simulation of future events. Other risk factors, however, are dependent on noise-varying parameters and must therefore be modeled.

A typical model represents one attribute and contains a single noise term $\epsilon$. For example, a well known model of the change in a stock price S over a time $\Delta t$ is provided by Black-Scholes as:

$$\frac{\Delta S}{S} = \mu \Delta t + \sigma \sqrt{\Delta t} \varepsilon \quad \text{(Equ. 2)}$$

where $\mu$ is a drift parameter, $\sigma$ is a factor indicating the volatility of the price, and $\epsilon$ is a noise component which is used to alter the volatility by a given amount at each step of the simulation and has a value between zero and one. For simplicity, this aspect of the invention will be illustrated with respect to the Black-Scholes model of Equ. 2. However, the invention can be applied to other, more complex multiple factor models.

According to the invention, historical data is analyzed to determine the actual value of the factors for each time index i (such as at the end of each trading day). This information and the historical values of the modeled value are applied to the model to determine the corresponding residual values $\epsilon_i$ which would recreate the historical value from the model using the historical factor values. In other words, the arbitrary model is solved for each residual value:

$$\epsilon_i = M^{-1}(dF, F, a_1, a_2, \ldots, a_n) \quad \text{(Equ. 3)}$$

Performing this using the example Black-Scholes model of Equ. 2 provides:

$$\varepsilon_i = \frac{1}{\sigma_{imp_i} \sqrt{\Delta t}} \left( \frac{\Delta S_i}{S_i} - \mu_{imp_i} \Delta t \right) \quad \text{(Equ. 4)}$$

where $\sigma_{imp,i}$ is the implied volatility, $\mu_{imp,i}$ is the implied drift, and $\epsilon_i$ is the historical residual value at index i (e.g., time t). Both $\sigma_{imp,i}$ and $\mu_{imp,i}$ can be determined, estimated, or implied from historical market data using conventional techniques.

The result of this process is a collection of one-dimensional indexed series of determined historical residual values $\epsilon_i$ for a set of times t in the historical record. This series is stored and used as discussed below.

For an arbitrary model with k different noise component residuals, there will be a corresponding series for each residual $\epsilon_{1,i} \ldots \epsilon_{k,i}$. As will be appreciated, if multiple residuals are present, there must a sufficient number of modeled equations on each historical day to permit the model to be solved for the residuals at each historical point. This is generally the case since some of the noise factors can be solved for using independent models. For example, a model of the change in the stock of a software company could include risk factors based upon measures of the software sector, and the market as a whole, e.g., $\Delta S/S = x\epsilon_1 + y(\text{sector})\epsilon_2 + z(\text{market})\epsilon_3$. Although this simplistic model has three noise factors $\epsilon_1 \ldots \epsilon_3$, the residual values for the sector and market could be solved for using separate models of these factors and then the results used when solving for the remaining value of $\epsilon_1$. Alternatively, the model can be adjusted, e.g., by combining the effect of various factors, to reduce the number of $\epsilon$ values to a solvable level. Appropriate techniques for doing this will be known to those of skill in the art.

For each of the parameters $a_1 \ldots a_n$ which were derived from the historical data, such as implied drift and volatility, this process also generates a corresponding indexed series of parameter values. Preferably, the sets of implied historical parameters are also stored for future use. Advantageously, because the historical residual values and parameter values are derived from historical data, subsequent analyses using "new" historical data can re-use much of the previously calculated data. The sets of implied parameters and derived residuals can be updated incrementally based on recent historical data points (and the oldest values deleted as appropriate). This reuse can substantially reduce the amount of processing which is required for subsequent simulations.

The distribution of values in the sequence of determined historical values E, will generally not be standard. According to one aspect of the invention, the generated historical residual values are used in a parametric model in place of the random components. Thus, the values of the historical residuals should be standardized to the range suitable for the corresponding random component in the model, typically an empirical average $E[\epsilon]=0$ and a variance $\text{var}[\epsilon]=1$. To preserve correlations which may exist between different sets of residuals from the historical sample, a linear standardization process can be applied to each residual value series, e.g., $\epsilon_i$, to provide a corresponding standardized series:

$$\epsilon'_i = \alpha\epsilon_i + \beta \tag{Equ. 5}$$

where the values of $\alpha$ and $\beta$ are selected to provide $E[\epsilon_i']=0$ and $\text{var}[\epsilon_i']=1$ for the given series of $\epsilon_i$ at issue (and may be different for different series).

Finally, the residuals (and determined parameters) are applied to the corresponding model. Initially, the values of the model parameters, such as drift and volatility, are determined for the starting point of the model, such as the most current values. At each simulated step in a scenario run, an index value x is selected at random and the value for the historical residual for that index value is substituted into the model to generate a simulated risk factor value which can then be used in the model to generate a simulated price or other modeled attribute. Preferably, the initial value for the parameters is used to generate each simulated risk factor value although, in an alternative embodiment, these values could also be adjusted as appropriate.

Thus, for the Black-Scholes model discussed above, the initial values of $\sigma_{imp}$ and $\mu_{imp}$ to use in the simulation are determined from the starting conditions. Then, the simulated scenario progresses using values of i selected randomly to access a "random" value of $\epsilon_i'$ from the set of historical residuals to produce a simulated value $\sigma_{imp}\epsilon'_i$ for the volatility risk factor which is used in the price model:

$$\frac{\Delta S}{S} = \mu_{imp}\Delta t + \sigma_{imp}\sqrt{\Delta t}\,\epsilon'_i \tag{Equ. 6}$$

More generally, for a randomly selected index value x, the simulation progresses as:

$$dF = M(F, a_1, a_2, \ldots, a_n, \epsilon_{1,x}, \epsilon_{2,x}, \epsilon_{k,x}) \tag{Equ. 7}$$

In a preferred embodiment, prior to performing the simulation process, a bootstrapping process is performed on the historical residuals. This process can be used to account for certain deficiencies in the data, adjust the statistical distribution, increase the number of available samples, or a combination of these or other factors. Various bootstrapping processes are discussed below.

In some situations, historical data may be missing, incorrect, or non-existent. This can occur, for example, when the performance of a new security must be simulated. In order to compensate for such gaps, the missing historical data can be back-filled with "synthetic" data generated using conventional techniques, such as extrapolating from valid data, drawing historical data from similar securities, or applying performance models. The synthetic historical data can be replaced by actual historical data as it becomes available. In addition, bad historical days, such as holidays, can be identified and corresponding historical residual values excluded from the set. Similarly, outliers can also be excluded, such as data points which differ from the mean by more than a selected multiple of the standard deviation, for example, 5.5*sigma.

During a simulation with a large number of scenarios, the number of historical residuals used will typically greatly exceed the actual number of samples calculated directly from the historical data. Thus, it may be necessary to increase the total number of historical residuals which are available. To address this situation, an n-day bootstrap procedure can be used to generate additional residual values for use during simulation. A preferred bootstrapping technique is to sum a set n of randomly selected samples and divide by the square-root of n to produce a new residual value:

$$\epsilon'' = \frac{\sum_{j=1}^{n} \epsilon'_j}{\sqrt{n}} \tag{Equ. 8}$$

This increases the total number of samples by a power of n (at the cost of reducing kurtosis, the fourth moment of the statistical distribution, for higher values of n). Preferably, a two-day bootstrapping is used. For a 250 day history, this process produces a sequence of up to 250*250=62,500 samples to draw on. Moreover, the low value of n=2 does not significantly reduce any fat-tail which may be present in the distribution.

In certain circumstances, it may be desirable to provide a sets of historical residuals in which the distribution has been normalized (e.g., the fat-tail has been removed), but the correlations are maintained. In accordance with the central-limit theorem, as n is increased, the distribution of the resulting residuals moves more towards a normal distribution. As a result, using a relatively high value of n, such as 6 or more, will artificially remove some or all of a distribution fat-tail which may be present while preserving the cross-correlations. By selecting intermediate values of n, the effect of the fat-tail can be reduced without completely eliminating it. In addition, by comparing historical distributions with and without the fat-tail it is possible to determine the shape of the fat-tail relative to a normal distribution.

According to another bootstrapping procedure, the distribution of residuals is symmetrized. This is useful for situations where the historical data produces variations in a risk factor which are generally skewed. A symmetrized set can be generated by randomly selecting two residual values i and j and combining them as:

$$\varepsilon'' = \frac{\varepsilon'_i - \varepsilon'_j}{\sqrt{2}} \quad \text{(Equ. 9)}$$

Various other bootstrapping techniques known to those of skill in the art can also be used and more than one modification to the originally derived set of historical residuals can be performed prior to the simulation. In order to preserve correlations that exist between the various sequences of (standardized) historical residuals, the same bootstrapping process should be applied to each historical residual sequence to be used in a simulation to provide new bootstrapped sequences. Preferably, standardization is performed prior to the bootstrapping procedure. However, it is possible to perform standardization after the bootstrapping process.

Regardless of the particular bootstrapping techniques which are used, after the working sets of historical residuals have been generated, they can be applied to the model to produce simulated instrument prices or other simulated values. In one embodiment, the values of the various risk factors used in the model at each set of the simulation can be determined "on-the-fly" as the simulation progresses. While this is a suitable process for simulation of a single instrument, when multiple instruments are simulated, on-the-fly risk factor evaluation may not be efficient because the same risk factor (and set of historical residuals) can be used during the simulation of several different instruments.

Figure 2:
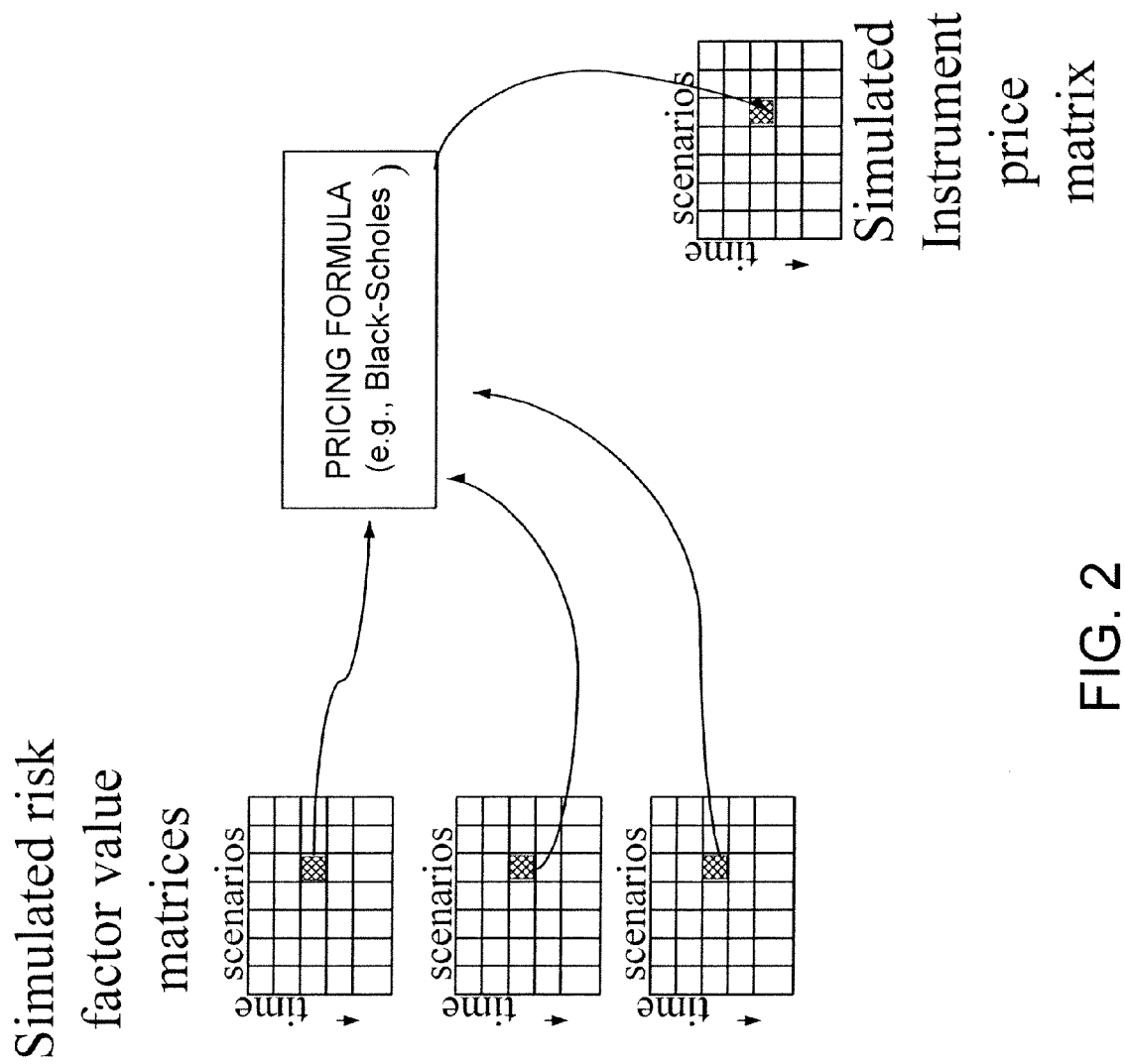
FIG. 2 is a diagram indicating the use of matrices of pre-calculated simulated risk factor values to a pricing model to generate a matrix of simulated instrument prices.

Accordingly, in a preferred implementation, and with reference to FIGS. 1 and 2, the evolving values of the risk factors themselves are simulated and the results for each risk factor are stored in a corresponding simulated risk factor matrix. After all of the relevant risk factors have been simulated and the matrices stored, the simulated risk factor data is applied as to the appropriate simulation model to produce a matrix of simulated price scenarios for the particular instruments of interest.

When multiple instruments are simulated the simulated price matrices for those instruments are aggregated using conventional techniques to produce a matrix of simulated prices for the entire portfolio. If multiple portfolios are being analyzed, each will generally have its own simulated pricing matrix which can be used to determine the VAR for the portfolio at a given percentile or for other purposes.

Figure 3:
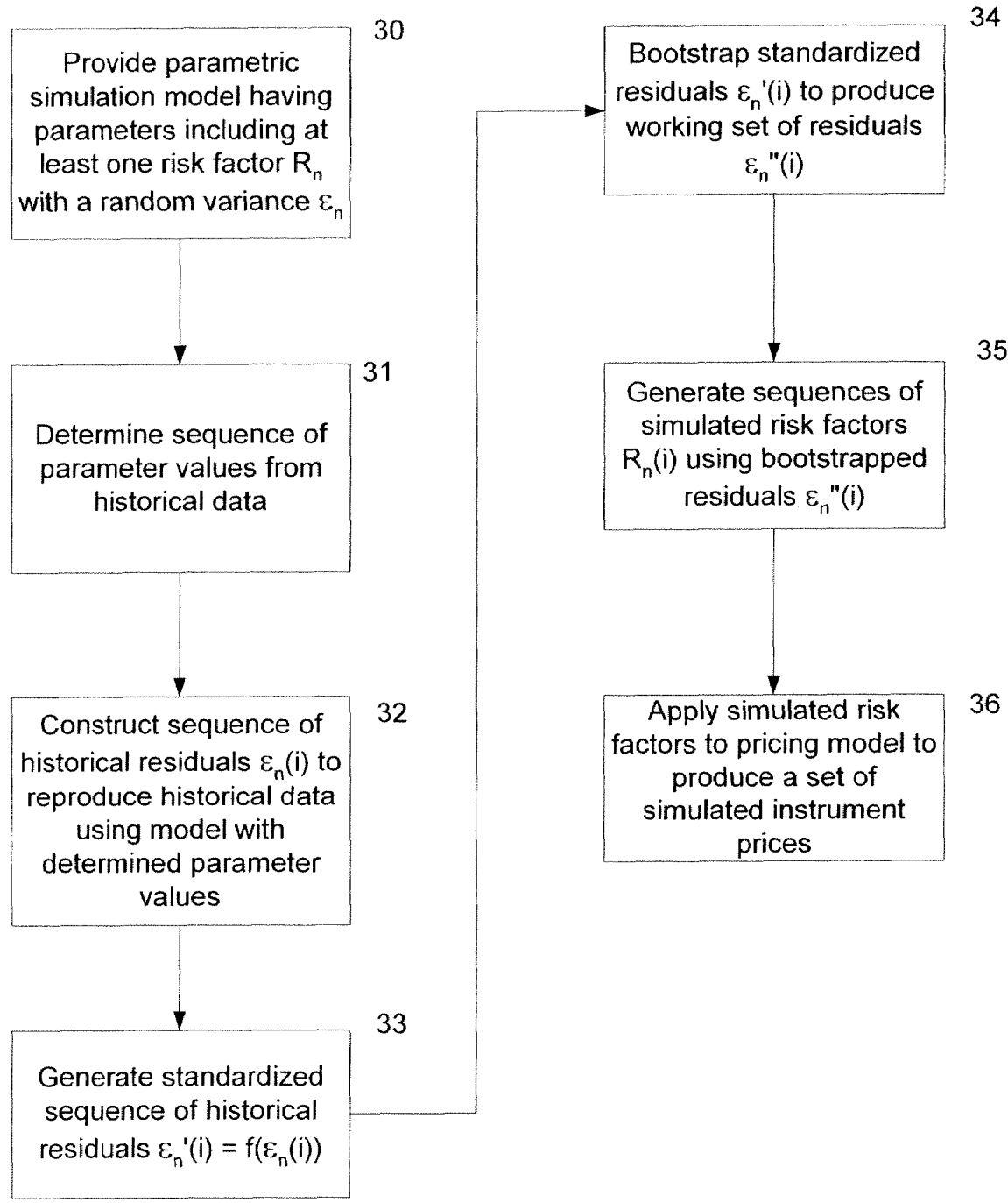
FIG. 3 is a flowchart of a method for simulating the risk factor values in a financial model in accordance with the present invention.

The simulation process as it applies to a single instrument is summarized in the flowchart of FIG. 3. Initially a suitable parametric simulation model is provided. (Step 30) Next, the values of the parameters for a set of historical data is determined (step 31) and a corresponding sequence of historical residual values are created which, when applied to the model using the historical parameter values, recreate the historical performance of the modeled attribute, such as price or a noisy factor to be used in a pricing model. (Step 32) The historical residuals are standardized (step 33) and then bootstrapped (step 34).

The working set of historical residuals can then be used to generate a simulated value matrix for each noisy risk factor, each of which contains the simulated value of the respective risk factor for each step of a number of simulated scenarios. (Step 35) Finally, the simulated risk factors are applied to the model to generate a corresponding matrix of simulated prices for the matrix which can be used in subsequent risk analysis. (Step 36)

Through the use of this method, the advantages of a parametric simulation methodology can be leveraged without having to determine and model cross-correlations between risk factors or adjust the random risk factor variations to reflect a fat-tail distribution. As a further advantage, the present invention provides a mechanism through which a single model can be developed which accurately models both short-horizon events (to determine VAR) and long-horizon events (to determine PE, the potential exposure), as opposed to the conventional practice which utilizes different models for short and long horizon simulations.

The present invention can be implemented using various techniques. A preferred method of implementation uses a set of appropriate software routines which are configured to perform the various method steps on a high-power computing platform. The input data, the generated intermediate values, simulated risk factors, priced instruments, and portfolio matrices can be stored in an appropriate data storage area, which can include both short-term (fast access) memory and long-term storage, for subsequent use. Appropriate programming techniques will be known to those of skill in the art and the particular techniques used depend upon implementation details, such as the specific computing and operating system at issue and the anticipated volume of processing. In a particular implementation, a Sun OS computing system is used. The various steps of the simulation method are implemented as C++ classes and the intermediate data and various matrices are stored in respective files and databases.

While the invention has been particularly shown and described with reference to preferred embodiments thereof, it will be understood by those skilled in the art that various changes in form and details can be made without departing from the spirit and scope of the invention.

The invention claimed is:

1. A financial instrument price simulation processor-implemented method comprising:
    providing via a processor a parametric model for an at least one financial instrument price having at least one noise-varying parameter $\alpha_n$ with a corresponding noise component $\epsilon_n$;
    determining values for the at least one parameter and the financial instrument price at various time indices i using historical data;
    deriving a set of historical residual values $\epsilon_{n,i}$ for each noise component $\epsilon_n$, the historical residual value $\epsilon_{n,i}$ at index i, when applied to the model with the determined parameter values at index i, at least substantially reproducing the determined financial instrument price at index i;
    standardizing each set of historical residual values $\epsilon_n$; and using values selected from the set of standardized historical residual values $\epsilon_n$ as the noise component during a simulation of the financial instrument price via the model, comprising generating a set of simulated parameter values using values selected from the corresponding set of standardized historical residual values $\epsilon_n$ for each noise-varying parameter $\alpha_n$ in the model;

storing the simulated values for each parameter; and applying stored simulated parameter values to the model to produce simulated financial instrument prices.

2. The method of claim 1, wherein the use of values comprises using values for a plurality of scenarios for each instrument in a portfolio to produce a corresponding set of simulated financial instrument price scenarios for each instrument in the portfolio.

3. The method of claim 2, further comprising:

aggregating the simulated financial instrument prices to produce a set of simulated portfolio value scenarios; and analyzing the simulated portfolio value scenarios to determine a value at risk for the portfolio.

4. The method of claim 1, further comprising:

symmetrizing the set of historical residual values prior to the use of selected historical residual values.

5. The method of claim 1, further comprising:

increasing the quantity of historical residual values available for use by applying a multi-day bootstrapping procedure to the set of historical residual values.

6. The method of claim 5, wherein a two-day bootstrapping procedure is used.

7. A financial instrument portfolio attribute value simulation processor-implemented method comprising:

providing via a processor an at least one parametric model for each of a plurality of financial instrument attribute values associated with a financial instrument portfolio, wherein each financial instrument attribute has at least one noise-varying parameter $\alpha_n$ with a corresponding noise component $\epsilon_n$;

determining values for each of the at least one parameters and the financial instrument attributes at various time indices i using historical data;

deriving a set of historical residual values $\epsilon_{n,i}$ for each noise component $\epsilon_n$, the historical residual value $\epsilon_{n,i}$ at index i, when applied to the model with the determined parameter values at index i, at least substantially reproducing the determined financial instrument attribute value at index i;

standardizing each set of historical residual values $\epsilon_n$;

using values selected from the set of standardized historical residual values $\epsilon_n$ as the noise component during a simulation of the financial instruments attributes values via the at least one model, wherein the use of values comprises using values for a plurality of scenarios for each financial instrument in the portfolio to produce a corresponding set of simulated financial instrument attribute value scenarios for each instrument in the portfolio;

aggregating the simulated financial instrument attribute values to produce a set of simulated portfolio attribute value scenarios; and analyzing the simulated portfolio attribute value scenarios to determine an at least one attribute value at risk for the portfolio.

8. A financial instrument price simulation processor-implemented method comprising:

providing via a processor a parametric pricing model having at least one parameter $\alpha_n$ with a corresponding noise component $\epsilon_n$;

determining values for the parameters at various time indices i using historical data;

deriving a set of historical residual values $\epsilon_{n,i}$ for each noise component $\epsilon_n$, the historical residual value $\epsilon_{n,i}$ at index i, when applied to the model with the determined parameter values at index i, at least substantially reproducing the attribute price at index i;

standardizing each set of historical residual values $\epsilon_n$;

applying a multi-day bootstrapping procedure to each set of historical residual values to increase the quantity of historical residual values in each set; and using values selected from the set of historical residual values as the noise component for the corresponding parameter during a simulation of the instrument price.

9. The method of claim 8, wherein the at least one parameter comprises volatility.

10. The method of claim 8, wherein the at least one parameter comprises drift.

11. The method of claim 8, wherein the historical data includes implied drift.

12. The method of claim 8, wherein the historical data includes volatility.

13. A financial instrument price simulation system, comprising:

a memory;

a processor disposed in communication with said memory, and configured to issue a plurality of processing instructions stored in the memory, wherein the processor issues instructions to:

provide a parametric model for an at least one financial instrument price having at least one noise-varying parameter $\alpha_n$ with a corresponding noise component $\epsilon_n$;

determine values for the at least one parameter and the financial instrument price at various time indices i using historical data;

derive a set of historical residual values $\epsilon_{n,i}$ for each noise component $\epsilon_n$, the historical residual value $\epsilon_{n,i}$ at index i, when applied to the model with the determined parameter values at index i, at least substantially reproducing the determined financial instrument price at index i;

standardize each set of historical residual values $\epsilon_n$; and use values selected from the set of standardized historical residual values $\epsilon_n$ as the noise component during a simulation of the financial instrument price via the model, wherein the processor issues further instructions to:

generate a set of simulated parameter values using values selected from the corresponding set of standardized historical residual values $\epsilon_n$ for each noise-varying parameter $\alpha_n$ in the model;

store the simulated values for each parameter; and apply stored simulated parameter values to the model to produce simulated financial instrument prices.

14. The system of claim 13, wherein the processor issues further instructions to:

use values for a plurality of scenarios for each instrument in a portfolio to produce a corresponding set of simulated financial instrument price scenarios for each instrument in the portfolio.

15. The system of claim 14, wherein the processor issues further instructions to:

aggregate the simulated financial instrument prices to produce a set of simulated portfolio value scenarios; and analyze the simulated portfolio value scenarios to determine a value at risk for the portfolio.

16. The system of claim 13, wherein the processor issues further instructions to:
symmetrize the set of historical residual values prior to the use of selected historical residual values.

17. The system of claim 13, wherein the processor issues further instructions to:
increase the quantity of historical residual values available for use by applying a multi-day bootstrapping procedure to the set of historical residual values.

18. The system of claim 17, wherein a two-day bootstrapping procedure is used.

19. A financial instrument portfolio attribute value simulation system, comprising:
a memory;
a processor disposed in communication with said memory, and configured to issue a plurality of processing instructions stored in the memory, wherein the processor issues instructions to:
provide an at least one parametric model for each of a plurality of financial instrument attribute values associated with a financial instrument portfolio, wherein each financial instrument attribute has at least one noise-varying parameter $\alpha_n$ with a corresponding noise component $\epsilon_n$;
determine values for each of the at least one parameters and the financial instrument attributes at various time indices i using historical data;
derive a set of historical residual values $\epsilon_{n,i}$ for each noise component $\epsilon_n$, the historical residual value $\epsilon_{n,i}$ at index i, when applied to the model with the determined parameter values at index i, at least substantially reproducing the determined financial instrument attribute value at index i;
standardize each set of historical residual values $\epsilon_n$;
use values selected from the set of standardized historical residual values $\epsilon_n$ as the noise component during a simulation of the financial instruments attributes values via the at least one model,
wherein the processor issues further instructions to use values for a plurality of scenarios for each financial instrument in the portfolio to produce a corresponding set of simulated financial instrument attribute value scenarios for each instrument in the portfolio;
aggregate the simulated financial instrument attribute values to produce a set of simulated portfolio attribute value scenarios; and
analyze the simulated portfolio attribute value scenarios to determine an at least one attribute value at risk for the portfolio.

20. A financial instrument price simulation system, comprising:
a memory;
a processor disposed in communication with said memory, and configured to issue a plurality of processing instructions stored in the memory, wherein the processor issues instructions to:
provide a parametric pricing model having at least one parameter $\alpha_n$ with a corresponding noise component $\epsilon_n$;
determine values for the parameters at various time indices i using historical data;
derive a set of historical residual values $\epsilon_{n,i}$ for each noise component $\epsilon_n$, the historical residual value $\epsilon_{n,i}$ at index i, when applied to the model with the determined parameter values at index i, at least substantially reproducing the attribute price at index i;
standardize each set of historical residual values $\epsilon_n$;
apply a multi-day bootstrapping procedure to each set of historical residual values to increase the quantity of historical residual values in each set; and
use values selected from the set of historical residual values as the noise component for the corresponding parameter during a simulation of the instrument price.

21. The system of claim 20, wherein the at least one parameter comprises volatility.

22. The system of claim 20, wherein the at least one parameter comprises drift.

23. The system of claim 20, wherein the historical data includes implied drift.

24. The system of claim 20, wherein the historical data includes volatility.

* * * * *